Nov. 17, 1953 W. M. ALLISON 2,659,869
ELECTRICAL SIGNAL DELAY DEVICE
Filed April 18, 1951

INVENTOR.
WILLIAM M. ALLISON
BY
Arthur G. Connolly
HIS ATTORNEY.

Patented Nov. 17, 1953

2,659,869

UNITED STATES PATENT OFFICE 2,659,869

ELECTRICAL SIGNAL DELAY DEVICE

William M. Allison, North Adams, Mass., assignor to Sprague Electric Company, North Adams, Mass., a corporation of Massachusetts Application April 18, 1951, Serial No. 221,660

8 Claims. (Cl. 333—30)

The present invention relates to delay devices, and more particularly to such devices in which electrical signals are given a desired time delay.

Among the objects of the present invention is the provision of novel delay devices that provide characteristic delay patterns.

A further object of the present invention is the provision of compact delay devices that are more convenient to use.

Figure 1:
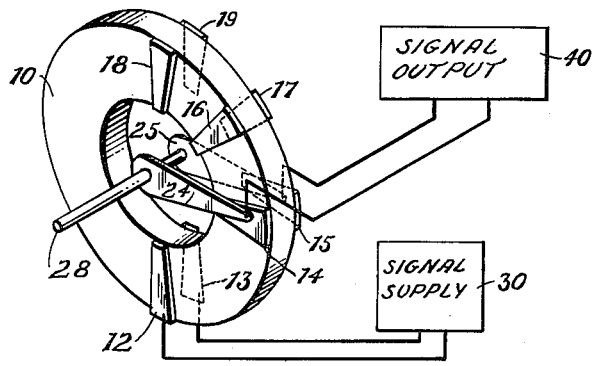
Figure 2:
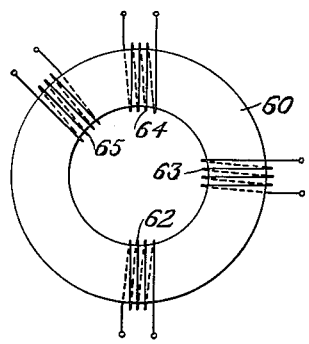

The above as well as additional objects of the present invention will be more fully understood from the following description of several of its exemplifications, reference being made to the accompanying drawings wherein:

Fig. 1 is a perspective view of one form of delay device of the present invention with signal supply and output components shown diagrammatically; and Fig. 2 is a plan view of a modified form of delay element embodying the present invention.

In accordance with the present invention a signal delay device is arranged to provide an endless or ring-shaped delay path so that signals supplied at one portion of the path travel around it in opposite directions and are repeated in a characteristic manner when picked up from other portions of the path.

Signal delaying devices have been applied to many different uses in the electrical communication and allied fields. Thus in identification systems for use with pulse-echo radar detection units, delaying devices can be used to repeat beacon signals from detected stations or for matching the time delay injected into the beacon signals by the beacon stations. Also, as indicated in Patent No. 2,495,740, granted January 31, 1950, delay devices are suitable for repeating multiplex signal transmission pulses.

In accordance with the present invention the ring-shaped character of the delay device causes impressed signals to travel one or more times around the ring in each direction so that a suitably located transducer picks up a succession of characteristically spaced signals. The number of signals in the succession depends on the attenuation of the signals as they travel around the ring.

Referring to Fig. 1, there is here shown a signal-carrying transducer ring 10 of piezo-electric material, in this case a barium-strontium titanate having 23% strontium titanate. The ring is flat and has on opposed portions of its flat faces a set of electrically conductive terminal or electrode pairs 12, 13, 14, 15, 16, 17, 18, 19. These terminals are suitably held in place as by being fired directly on the ceramic body of the ring.

Signals are supplied to one pair of terminals 12, 13 by unit 30 which can be any suitable type of pulse signal generator, and can be taken from any of the other electrode pairs and delivered to the desired signal-utilizing circuit shown in the figure as the signal output 40. Within the electrical input ring the signals are translated into mechanical vibrations which are carried about the ring acoustically, that is by compressional waves set up by the supply transducer.

Where selective use of the electrodes is to be made, a selector can be provided very simply as by a pair of contact arms 24, 25 suitably journalled on a central shaft 28 provided with a grip knob (not shown). The arms may be of springy construction so that they hold themselves in good contact with the electrodes.

Most piezo-electric material such as quartz, Rochelle salts and the like, are of oriented crystal form and will operate without special electrical pretreatment. The high-dielectric-constant titanates such as the one described above are of unoriented form and for best results should be electrically polarized with a direct current potential applied between the electrode pairs. This potential which can be anything up to about 50 volts per mil of ring thickness is readily impressed by the supply and output units 30, 40 through the same leads that carry the signals. By reason of their fluctuating character the signals are readily combined with and distinguished from the polarizing voltage as is well known. However after being once polarized, the polarizing voltage can be completely removed without entirely eliminating its effects. This makes a very simple type of installation.

A convenient thickness for ring 10 is about 12–20 mils, but this dimension is not critical. Where high-dielectric-constant titanates are used over extensive temperature ranges, the mixed compositions described in Burnham et al. application Serial No. 540,270, filed June 14, 1944, are preferred.

Fig. 2 shows a similar signal delaying device using a magneto-strictive ring 60 of magnetic material. One highly effective form of ring is made by suitably molding a zinc-nickel ferrite as described for example in the monograph "New Developments in Ferromagnetic Materials" by J. L. Snoek, published 1947 by the Elsevier Publishing Company, New York, pages 77 to 98.

Around the ring 60 are wound a plurality of signal transducers shown as coils 62, 63, 64, 65. These can be used either to deliver signals to the ring or away from the ring, as described in Patent No. 2,495,740. For best results the ring 60 should be magnetically polarized. In this form of the invention, the signals are also carried by acoustic vibration in the ring.

The rings of the present invention can be conveniently held in place in any desired manner. Thus the electrodes of the construction of Fig. 1 can carry projections that are readily soldered or otherwise secured to a holder mount. The ring of Fig. 2 can be held by the projecting coil ends, or if desired, the coils of this construction can be wound on bobbins built around a portion of the ring and used as holding means. Losses due to the mounting are relatively small.

A feature of the present invention is the simplicity with which the signal delay is provided. The rings themselves are even more compact than the elongated prior art delay devices such as shown in Patent No. 2,495,740. Furthermore no precautions need be taken with respect to undesired end reflections, since the rings do not show these reflections. Furthermore, manipulatable selector devices are much simpler to construct for the circularly distributed contacts of a ring as against the row of contacts needed with elongated delay devices.

Instead of providing a limited number of electrode pairs, as shown in Fig. 1, for example, the ring 10 can be completely filled with transducers or electrodes crowded together as closely as desired.

The mean effective diameters of the rings of Figs. 1 and 2 can be conveniently made from about ½ inch to about 3 or more inches. The width of the ring, that is the difference between outer and inner radii, should be relatively small, about ⅛ to ¼ inch for example.

As many apparently widely different embodiments of this invention may be made without departing from the spirit and scope hereof, it is to be understood that the invention is not limited to the specific embodiment hereof except as defined in the appended claims.

What is claimed is:

1. A signal delaying device having a stationary ring-shaped transducer adapted to function as an acoustic signal carrier, a first signal translator linked with one portion of the carrier for receiving electrical signals and translating them into corresponding mechanical signals in the carrier, and at least one output translator linked with a different portion of the carrier for retranslating said mechanical signals into electrical signals corresponding to the received signals but delayed in time in accordance with the internal acoustic travel and for automatically repeating the delayed signals by reason of the parallel acoustic paths provided by the ring shape of the carrier.

2. The combination as defined by claim 1 in which the carrier is a ring of alkaline earth metal titanate in which the alkaline earth metal includes at least one of the class consisting of strontium and barium.

3. The combination as defined by claim 1 in which the carrier is a ring of magnetostrictive material.

4. The combination as defined by claim 2 in which each translator is in the form of a pair of electrodes on opposite sides of the ring portion to which it is linked.

5. The combination as defined by claim 2 in which the ring is flat and each translator is in the form of a pair of electrically conductive coatings opposite each other on the opposed faces of the ring.

6. The combination as defined by claim 5 and further including a movable contact structure having contacts pivotally held for adjustment to engage the coatings of the different output signal pattern.

7. A unitary electronic signal delaying device for interposing a predetermined time delay in the transfer of an ultra high frequency pulse signal wave comprising, a stationary solid ring-shaped transducer, an input signal translator connected about one portion of said ring-shaped transducer for receiving electronic signals and translating them into corresponding mechanical signals in the body of said transducer, an output signal translator connected on a remote portion of said ring-shaped transducer for reconverting said mechanical signals transferred through the body of said transducer into electronic signals which correspond to but are delayed in time with respect to said input signals.

8. The combination set forth in claim 7 in which a second output signal translator is positioned on said ring-shaped transducer at a point remote from said input signal translator and said other output signal translator, and means for selectively connecting either of said output signal translators into an electronic network for retransfer of said delayed signal.

WILLIAM M. ALLISON.

References Cited in the file of this patent

UNITED STATES PATENTS

| Number | Name | Date |
|---|---|---|
| 1,671,151 | French et al. | May 29, 1928 |
| 2,105,318 | Goldsmith | Jan. 11, 1938 |